May 18, 1948. D. C. HEITSHU 2,441,630
TRAILER HITCH
Filed Nov. 8, 1944 10 Sheets-Sheet 1
Fig. 1.
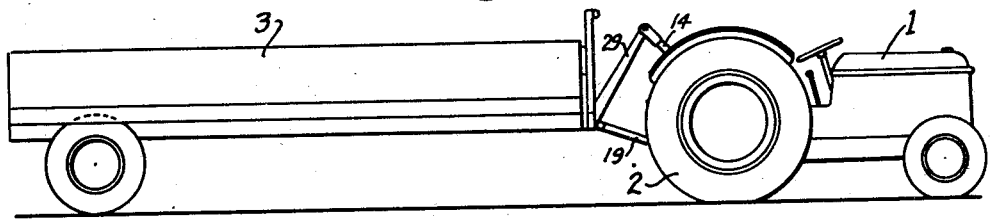
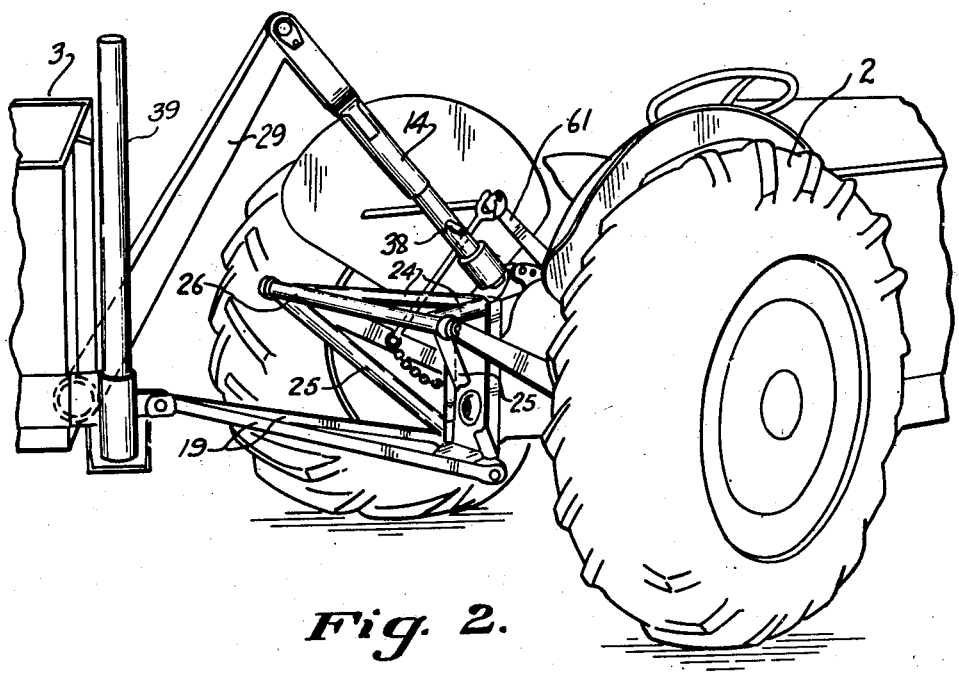
Fig. 2.
INVENTOR.
Daniel C. Heitshu
BY
Barnes, Kisselle, Laughlin + Reisch
Attorneys May 18, 1948. D. C. HEITSHU 2,441,630
TRAILER HITCH
Filed Nov. 8, 1944 10 Sheets-Sheet 2

INVENTOR.
Daniel C. Heitshu
Barnes, Kisselle Laughlin & Raisch
Attorneys

May 18, 1948.  D. C. HEITSHU  2,441,630
TRAILER HITCH
Filed Nov. 8, 1944  10 Sheets-Sheet 4

INVENTOR.
Daniel C. Heitshu
BY
Barnes, Kisselle, Laughlin & Raisch
Attorneys

May 18, 1948.   D. C. HEITSHU   2,441,630
TRAILER HITCH
Filed Nov. 8, 1944   10 Sheets-Sheet 5

INVENTOR.
Daniel C. Heitshu
BY
Barnes, Kisselle, Laughlin & Raisch
Attorneys

May 18, 1948.　　　D. C. HEITSHU　　　2,441,630
TRAILER HITCH
Filed Nov. 8, 1944　　10 Sheets-Sheet 6

INVENTOR.
Daniel C. Heitshu
BY
Attorneys

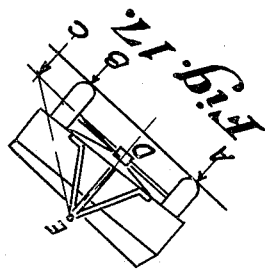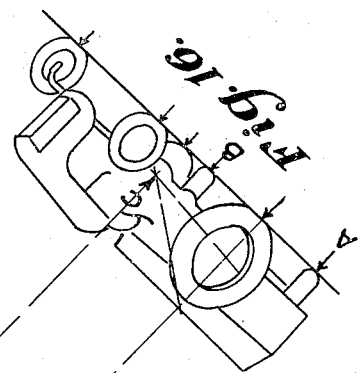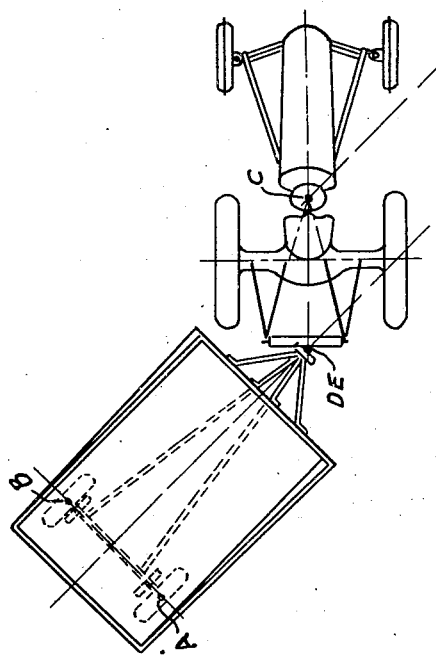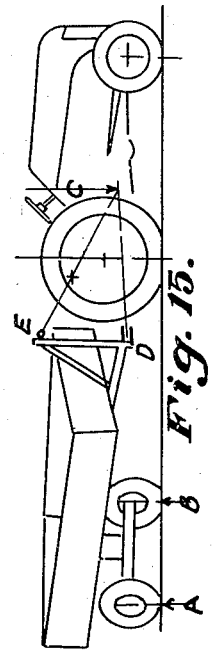

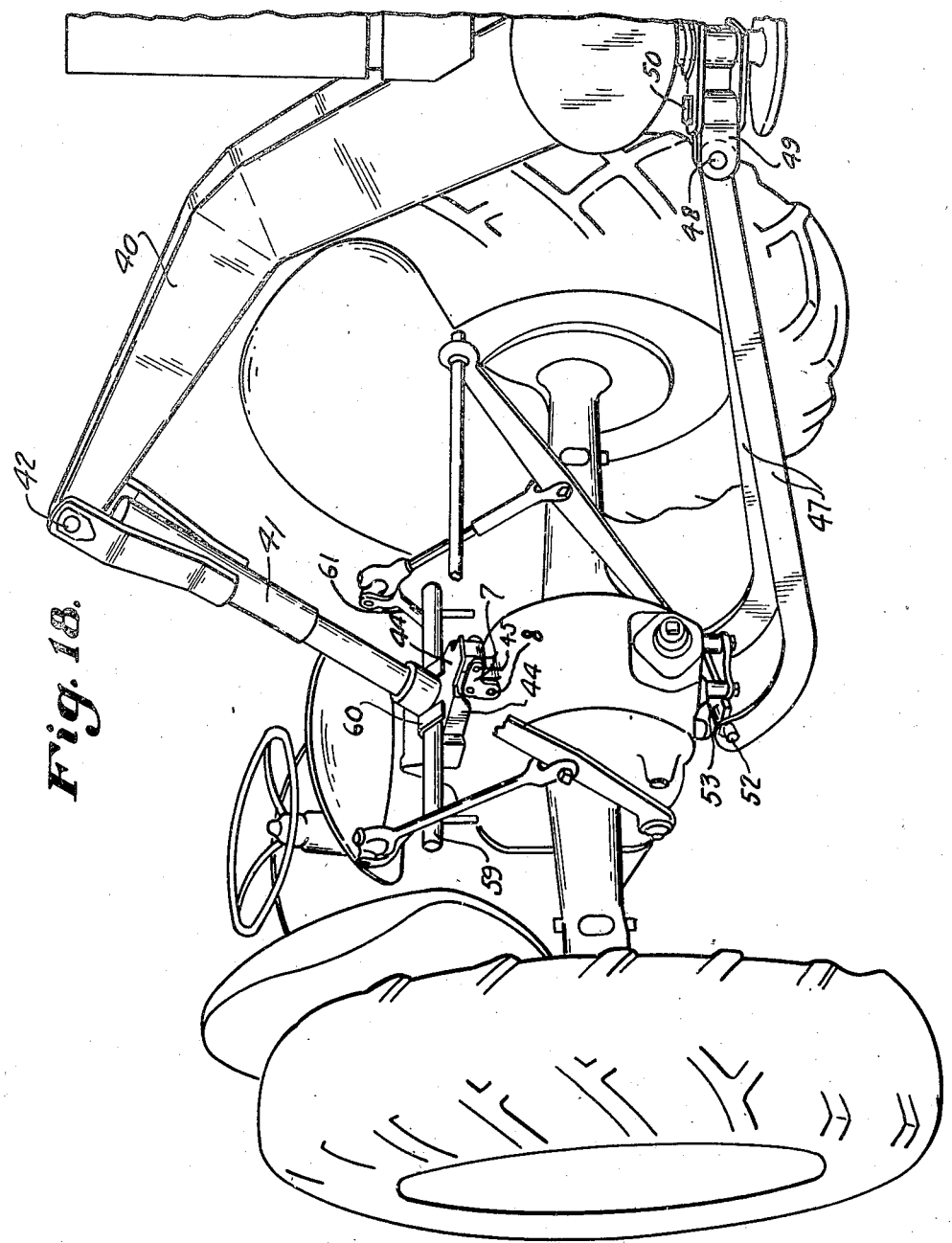

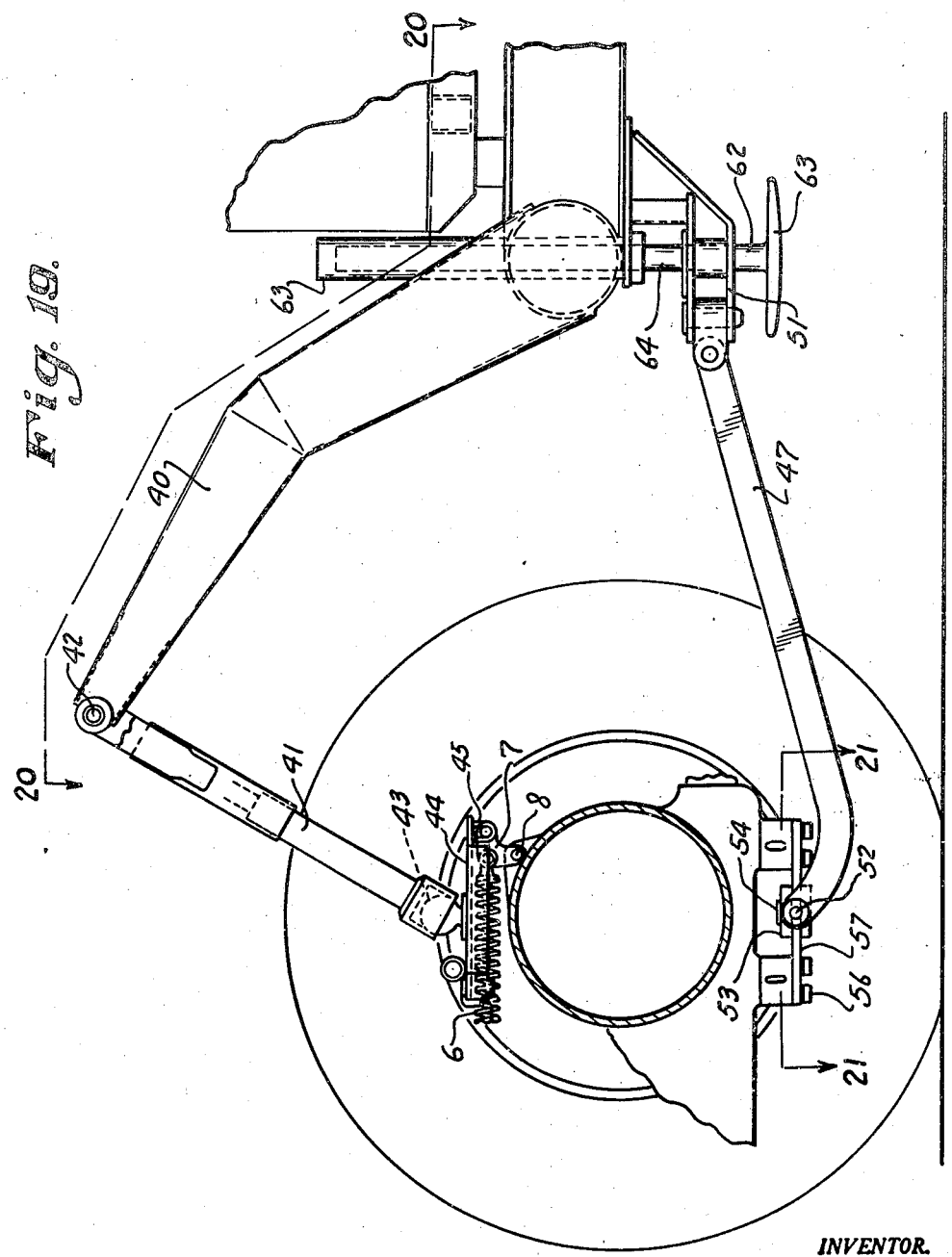

May 18, 1948.　　　　D. C. HEITSHU　　　　2,441,630
TRAILER HITCH
Filed Nov. 8, 1944　　　　10 Sheets-Sheet 10
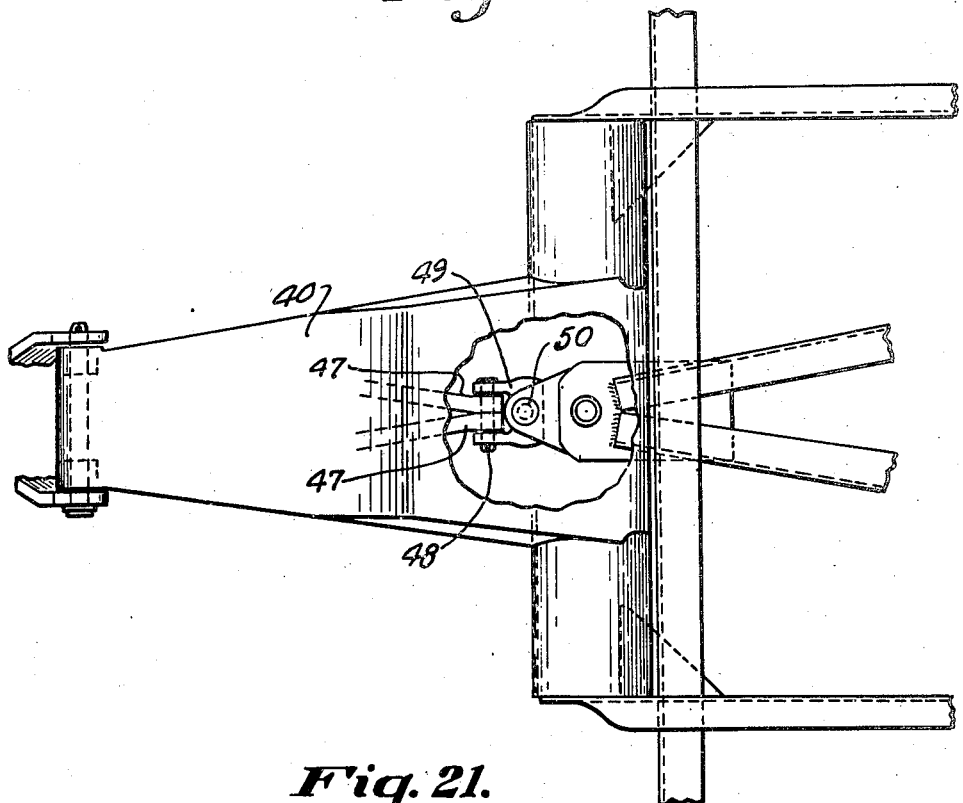
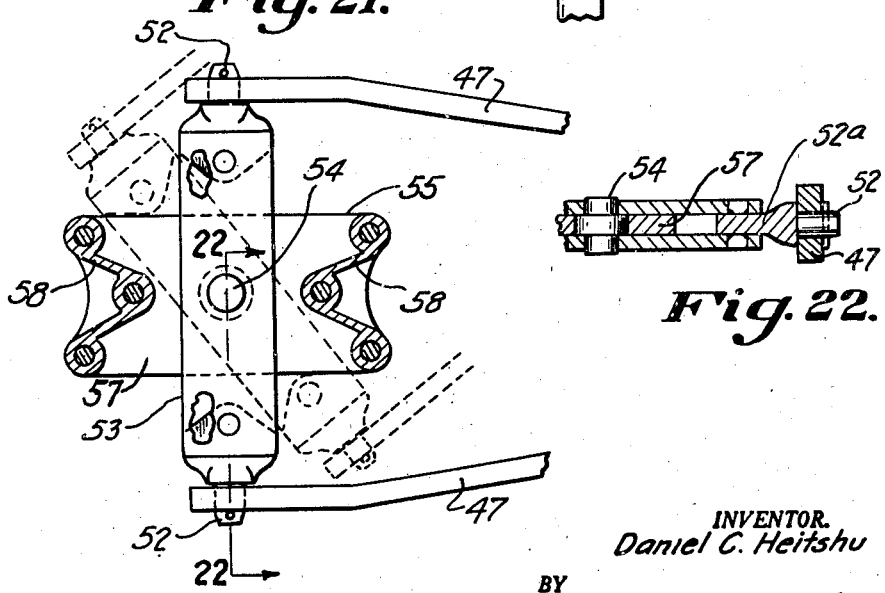
INVENTOR.
Daniel C. Heitshu Patented May 18, 1948

2,441,630

UNITED STATES PATENT OFFICE 2,441,630

TRAILER HITCH

Daniel C. Heitshu, Brightmoor, Mich., assignor to Harry Ferguson, Inc., Dearborn, Mich., a corporation of Delaware Application November 8, 1944, Serial No. 562,445

16 Claims. (Cl. 280—33.4)

The present invention relates to trailer hitches and more particularly to hitches for two-wheeled trailers which are characterized in that the wheels are located toward the rear end of the trailer so that a substantial part of the trailer load must be carried on and supported by the tractor or other motive means.

Many light weight farm and industrial tractors of which the make known commercially as the "Ford tractor-Ferguson system" is exemplary, are designed for numerous other uses than the single one of pulling a trailer, yet on occasion it may become highly desirable to make use of the tractor for this purpose. Because of their light weight the maximum load that may be pulled is limited when the trailer hitch provides only a straight draft connection. However, efforts to increase traction by supporting a part of the trailer load on the tractor have not heretofore been successful, particularly with multi-purpose light weight tractors, because of the improper application of the trailer load to the tractor. As an example of such prior structures reference may be had to the patent to Ferguson No. 2,347,898 issued May 2, 1944, which discloses a hitch means that, while it will operate with fair satisfaction under limited conditions, will, as will appear later, fail under many other ordinary conditions.

The present invention has as its general aim the provision of a new and improved hitch which overcomes prior difficulties and, among the more important of the operational features, produces high draft load with a light weight tractor, does not interfere with steering, provides full support for the load in all relative positions of the tractor and trailer, and yet may be incorporated in or attached to a multi-purpose tractor without interference with other operation or structural parts thereof.

Another object is to provide a new and improved hitch for a tractor drawn two-wheeled trailer which embodies a combination of a hitch connection defining a line of draft force between the tractor and trailer extending generally longitudinally and horizontally below the tractor rear axle, a supporting member for the front end of the trailer including a forwardly and downwardly sloping part arranged and disposed to transmit the load to the tractor along a line which intersects the line of draft force below and ahead of the tractor rear axle and at such an angle as to hold the point of intersection substantially between the tractor rear wheels in the relative swinging positions of the tractor and trailer, and a universal pivotal connection between the front end supporting member of the trailer and the tractor located substantially on or just to the rear of the center of effort of the tractor rear wheels.

In conjunction with the foregoing, another object is to provide in the load supporting member of such a hitch, a pivotal connection which permits only of relative movement of the tractor and trailer resulting from pitching, the supporting member otherwise resisting all twisting or bending forces developed in the operation of the mechanism.

Other objects and advantages will become apparent in the following description and from the accompanying drawings in which:

Fig. 1 is a side elevation of a tractor and trailer.

Fig. 2 is the perspective of a portion of the tractor and a portion of the trailer showing the improved hitch connection.

Figs. 14, 15, 16 and 17 are views of the same prior art trailer-tractor coupling showing how in turning the application of the forces affect tilting or twisting of the trailer.

Fig. 18 is a perspective view of a modified form of my invention.

Fig. 19 is a side elevation of the same showing the tractor rear housing in cross section.

Fig. 20 is a plan view of the front end of the trailer.

Fig. 21 is a section on the line 21—21 of Fig. 19.

Fig. 22 is a section on the line 22—22 of Fig. 21.

It has been proposed in the prior art to support a trailer on a multiple purpose tractor by swiveling the same to the rear ends of the hitch links. This is shown and claimed in the United States patent of Henry George Ferguson, No. 2,347,898, dated May 2, 1944. While this has been measurably satisfactory, it has interfered somewhat with steering, and also has resulted in twisting and tilting of the trailer when the tractor makes a sharp turn. This is very disadvantageous and dangerous, especially when the tractor-trailer combination is traveling on an inclined surface or the trailer or tractor drops into a depression. This twisting action, due to the sharp turn, coupled with the tilt, due to the incline or depression, may well upset the trailer.

Figure 7:
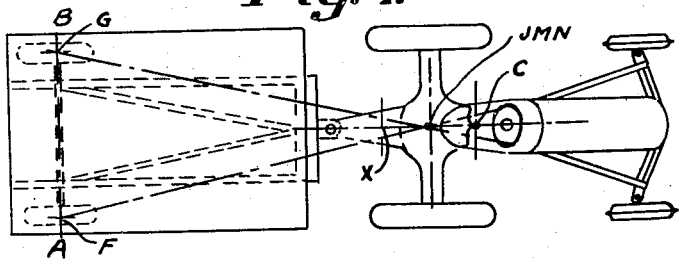
Fig. 7 is a diagrammatic plan view of the improved tractor and trailer hitch connection.
Figure 9:
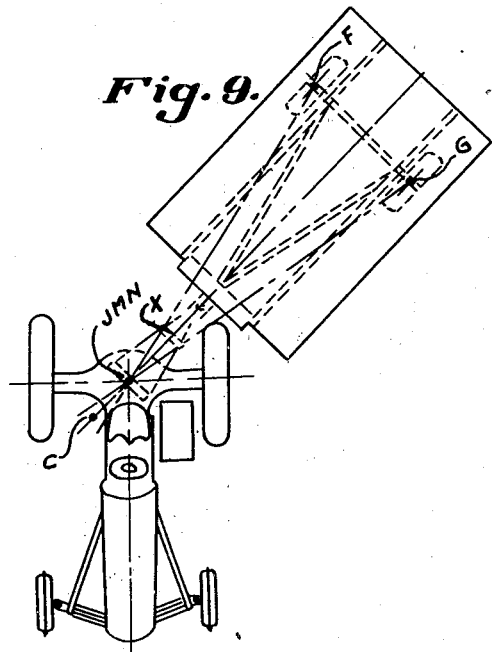
Fig. 9 is a diagrammatic plan view of a tractor-trailer showing the tractor making a sharp turn.
Figure 10:
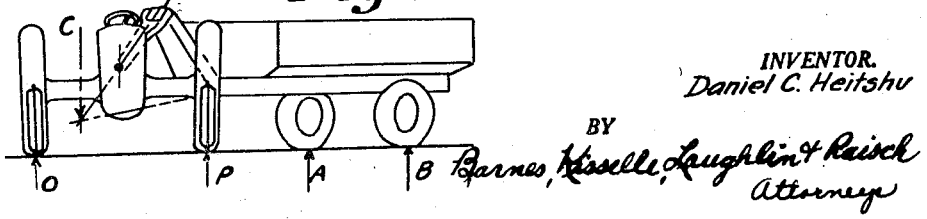
Fig. 10 is a diagrammatic front view showing the tractor making a sharp turn.
Figure 11:
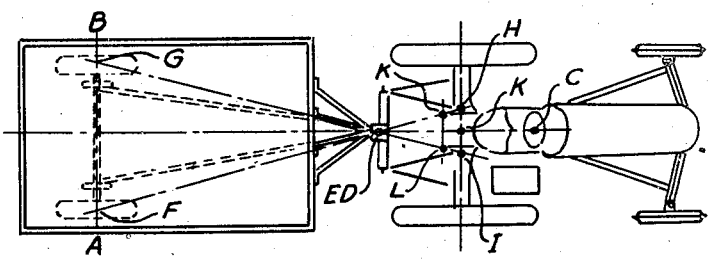
Figs. 11, 12 and 13 are diagrammatic views of prior art arrangements for supporting an overloaded, two-wheel trailer on a hitch and tractor. These views show the application of the forces insofar as they affect steering.
Figure 12:
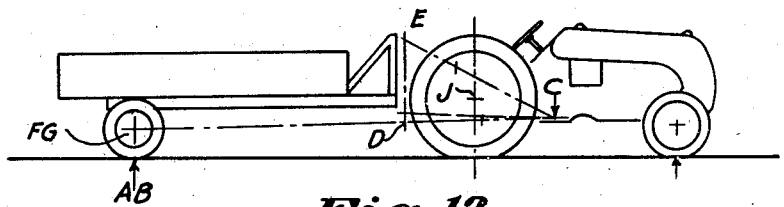
Figure 13:
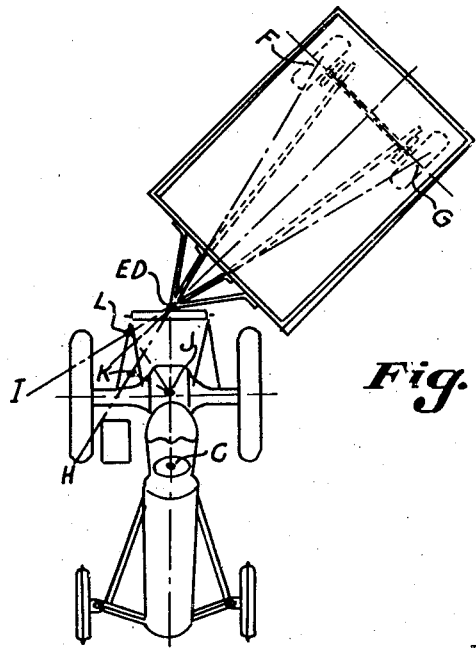

Referring to Figs. 11 to 13, it will be seen how the aforesaid coupling of the tractor and overbalanced two-wheel trailer results in interference with steering. GI and FH are the lines of the draft. The line EC is the line of the compression stresses due to the load of the overbalanced trailer. The point where the line EC intersects the extended tension line of the draft links at C is the point of application of the load to the tractor. It is desirable to get this point forward of the rear axle so as to keep the front of the tractor from being uplifted by the load of the trailer. It is also desirable to have this point far enough forward on the tractor to prevent so-called "gear climbing" when the draft load is extremely heavy. By "gear climbing" we mean the differential gears cause the front end of the tractor to rise up because it is easier work than pulling the load of the trailer. However, the farther forward the point of load application is the harder the steering is because the greater the effort forcing the front wheels into the ground. Consequently, with these several factors in mind, it is desirable to have the point of application of the load a reasonable distance forward of the rear axle at the point C such as shown in Figs. 7 and 9. The point is kept to the rear in order to increase the weight upon the traction wheels, also the rear tractor tires and rear axle are designed to support much greater loads thereby permitting more weight to be transferred from the trailer than would be possible if it was applied near the front axle. The point of application of the load is not forward of the most advanced surface of the traction wheels, but it is some distance forward of the rear axle, to wit: slightly less than the diameter of the traction wheels.

Now referring to Figs. 11 and 12, where a coupling arrangement similar to that shown in the prior Ferguson Patent No. 2,347,898 is illustrated, it will be seen that with a straight-line arrangement of tractor and trailer, the draft lines of force, FH and GI, intersect the rear axle of the tractor at equidistant points from the midpoint of the axle and the draft is equally balanced in respect to the center of effort of the tractor. But in Fig. 13 the tractor is shown making a sharp turn. Here the two lines of draft GI and FH are both thrown towards one end of the axle. The result is that the pulling strain on the left-hand end of the axle is much greater than on the right-hand end. Consequently, when it is sought to turn the tractor to the right, as shown in Fig. 13, the front wheels must produce an opposite moment of force greater than the side draft if the turn is to be made. The result is that when this side draft force is greater than the traction of the front wheels they will slide sideways and a sharp turn is impossible.

Referring to Figs. 14, 15, 16 and 17: This is another diagrammatic representation of such a coupling of an overbalanced, two-wheel trailer on hitch links, as is shown in the prior Ferguson Patent No. 2,347,898. These views are given in order to show how a sharp turn of the tractor with respect to the trailer twists or tilts the trailer. The joint E between the upper link and the mast ED on the trailer is a universal joint, as shown and described in the prior Ferguson Patent No. 2,347,898. The draw bar and the coupling of the lower links with the draw bar joint D, constitute another universal joint connection between the trailer and the hitch. When the tractor angles sharply with respect to the trailer, as shown in Figs. 14, 15 and 16, the top link and the top of the trailer mast ED are pushed over to one side, namely, to the left in Figs. 14 and 17. This is due to the fact that the point of application of the load remains at C approximately on the same point on the tractor, (Fig. 14). But it is now way out to one side, to-wit: the right side of the trailer, as shown at C in Fig. 17. Hence, the compressive load of the top link of the overbalanced trailer is exerted on the side of the mast at considerable of an angle. This twists the trailer frame as shown in Figs. 15 and 17, and requires the outside trailer tire, as shown at A, Figs. 16 and 17, to support most of the weight of the rear end of the trailer.

Obviously, if the trailer frame is already tilted because the vehicle is on an incline or because a trailer which has dropped into a depression, then a sharp turn causing additional tilt in the same direction may upset the trailer.

It is the object of the present invention to overcome the bad features hereinbefore referred to by coupling the overbalanced trailer to a tractor designed to take a hitch, for use with farm implements and other tools and machines. To this end the improved coupling arrangement contemplates locating the vertical line of swiveling on a vertical line passing through the mid-point of the axle, if possible, or as near that point as is possible, having in mind using a multiple purpose tractor with its standard equipment and hitch parts. With a tractor-trailer hook-up so arranged with a hinge arrangement between the end of the trailer mast and the upper link which permits hinging only in a vertical plane, it is possible to obviate the steering difficulties above described and also eliminate the twisting of the trailer frame. Figs. 7, 8, 9 and 10 show how this is accomplished.

Figure 8:
Fig. 8 is a diagrammatic side view of the same.

The trailer swiveling line MN, Figs. 7, 8 and 9, is located at J, which is a vertical line passing through the midpoint of the rear axle. The swiveling line is located either on this vertical line passing through the midpoint of the tractor rear axle or as near thereto as possible. The upper compression link of the hitch stays in line with the trailer and continues to coincide with the longitudinal centerline of the trailer, as shown in Fig. 9, because the hinge shown at X, permits hinging only in a vertical plane. The result is that the upper link swings with the trailer and, the point of application of the load forces of the trailer on the tractor swings to the side, as shown in Fig. 9. The load is delivered on the tractor rear axle, when viewed from above, at an angle to the rear axle less than 90°, in place of being perpendicular to the axle, as when the two vehicles are in line. The result is that there is no twisting of the body of the trailer at this sharp angle as will be seen by reference to Fig. 10.

It is desirable to have the arc on which the point of application of the trailer load to the tractor swings within the rear wheels as is shown in Fig. 9, so that the load when the trailer and tractor are at a sharp angle does not tend to upset the tractor sidewise, since it remains within the base of support provided by the rear wheels.

The mast or tongue is made of sturdy cross section to withstand torsional stresses as well as beam loads. These torsional stresses are not produced by the weight transferred from the trailer to the tractor even when the trailer is sharply angled, but are produced by forces which tend to move the trailer laterally in respect to the tractor as on a hillside or when one rear wheel of the trailer sinks into the soil more than the other. Or it may be due to the tilting of the tractor laterally at the rear wheels.

The numeral 1 designates a tractor (see Fig. 1) provided with the usual traction wheels 2. 3 is the overbalanced two-wheel trailer. Of course, it is a common thing for a truck or tractor to be designed to support the load of a semi-trailer on a fifth-wheel or ball and socket coupling at or near a vertical line passing through the midpoint of the rear axle, but these arrangements are such as they ordinarily disenable the truck or tractor to be used for any other purpose. The object of the present invention is to take a tractor which is provided with a hitch which is primarily designed to handle farm implements or other similar machines and adapt this to coupling with an overbalanced two-wheel trailer so as to apply the load to the rear axle of the tractor at the most desirable and advantageous point, having in mind ease of steering and the stability of the trailer. The tractor shown is the well known Ford tractor which is equipped with the Ferguson system described and claimed in Patents Nos. 2,118,180 and 2,118,181.

Figure 3:
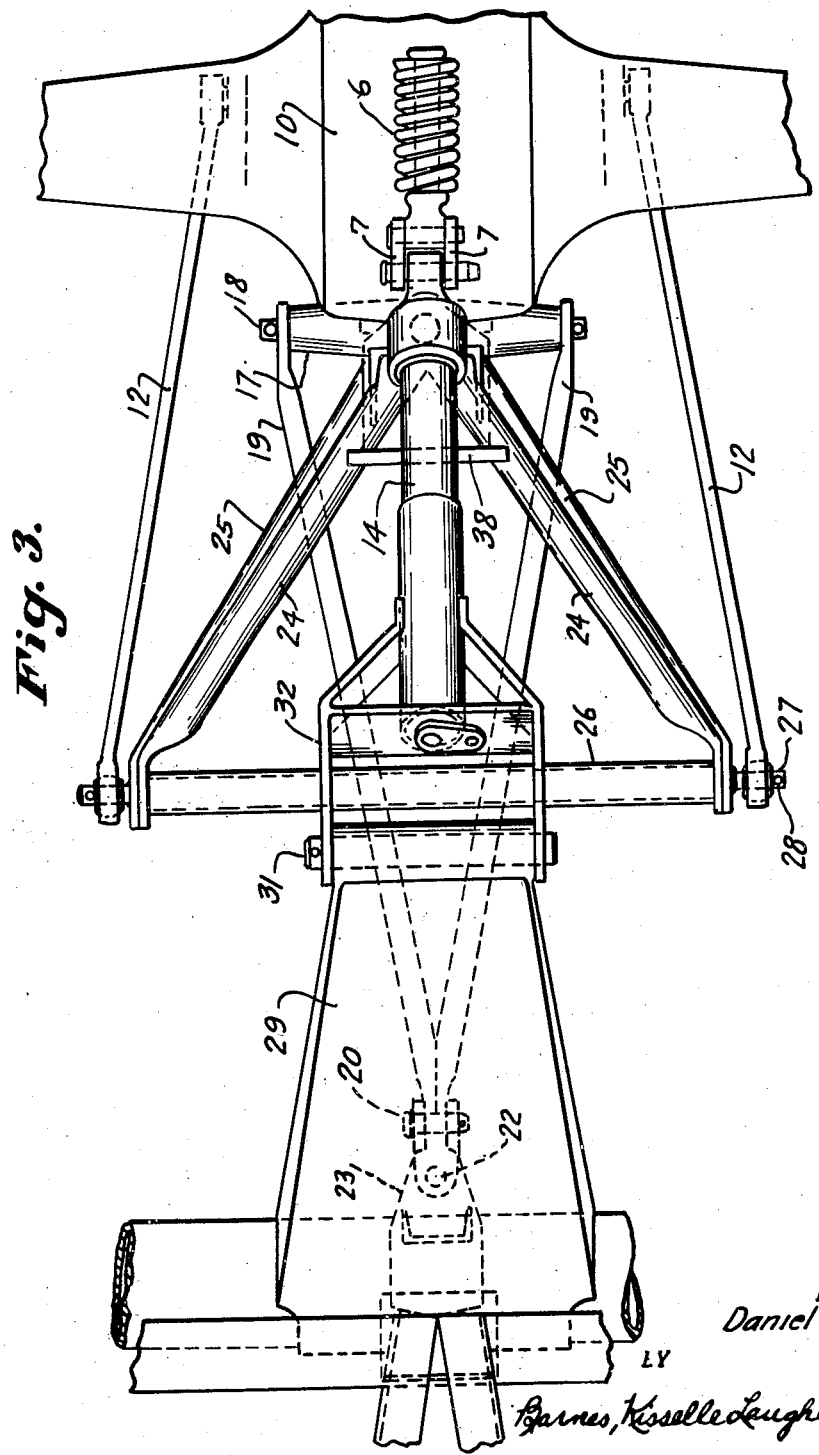
Fig. 3 is a plan view of the same.
Figure 4:
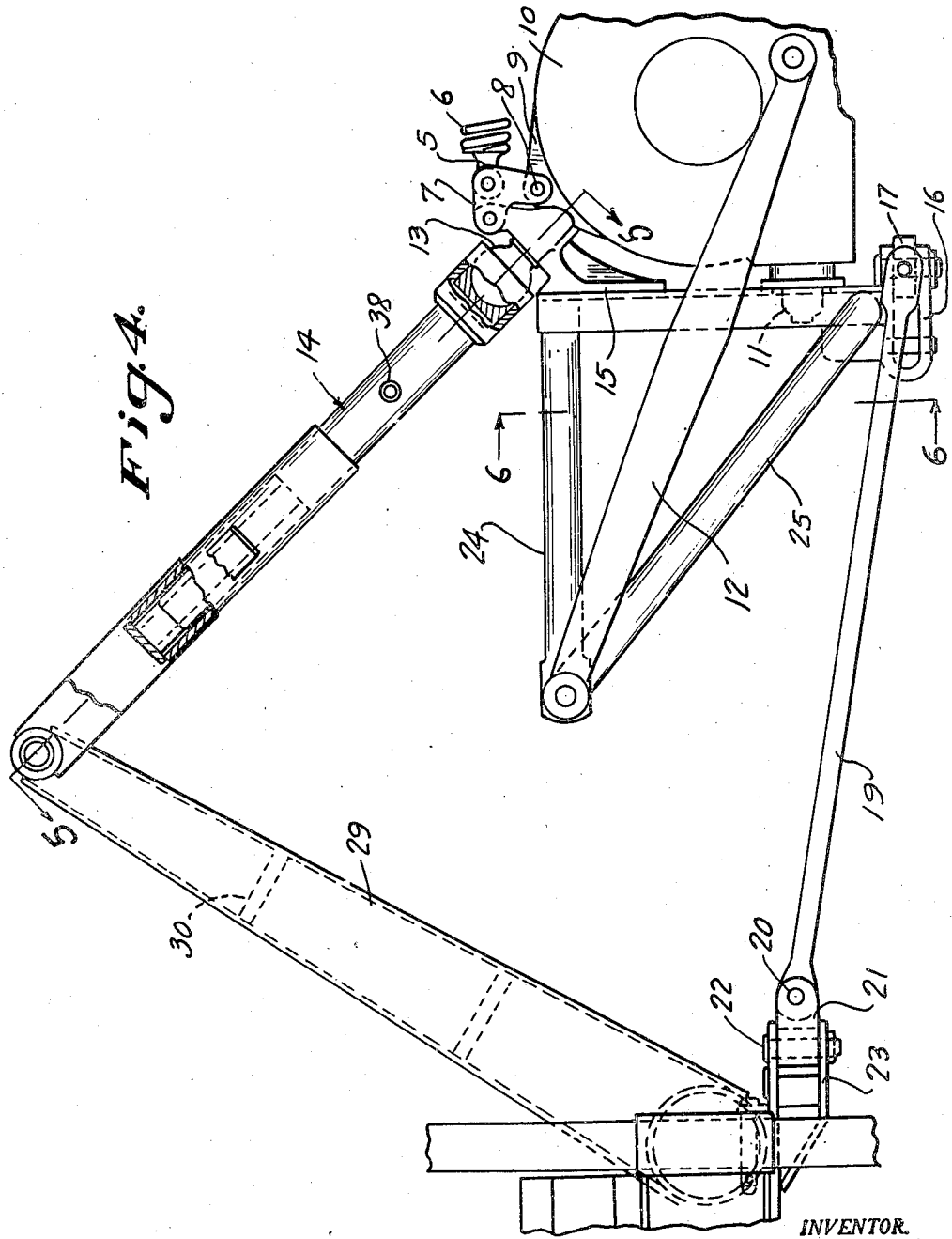
Fig. 4 is a side elevation of the same.
Figure 5:
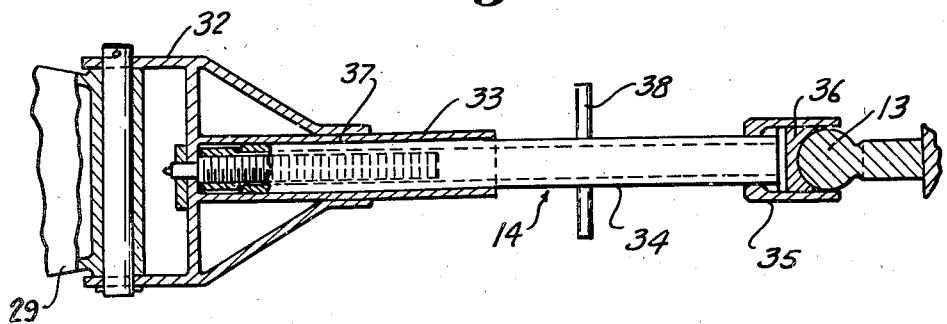
Fig. 5 is a detail largely in longitudinal section of the upper hitch link, taken on the line 5—5 of Fig. 4.
Figure 6:
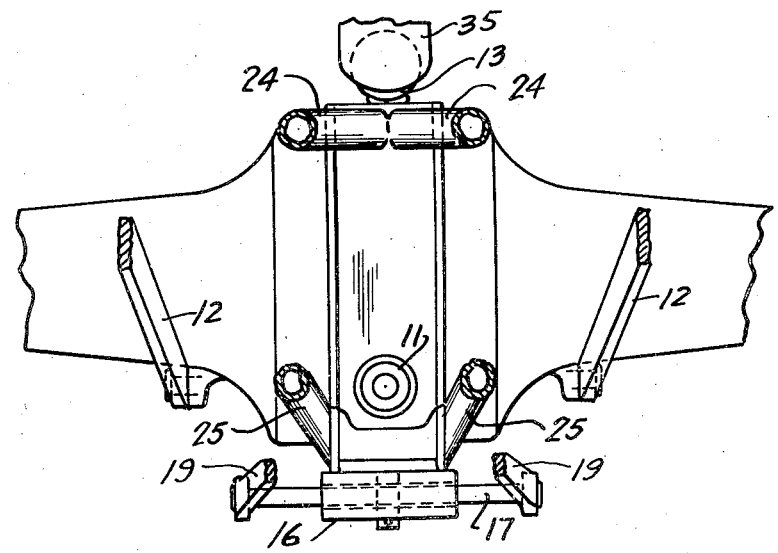
Fig. 6 is a section taken on the line 6—6 of Fig. 4.

Referring to Fig. 4, 5 is the rod used in the Ferguson control means to control the hydraulic lifting means which need not here be shown or described. 6 is the usual spring that aids in that control. 7 is the bell crank lever to which is ordinarily attached the upper compression link of the Ferguson hitch. This bell crank lever is pivoted at 8 on a boss 9 on the rear axle housing. This is all standard Ford-Ferguson construction. 10 is the differential housing of the tractor; 11 is a screw cap covering the power take-off shaft. 12 are the two lower draft links of the conventional "Ford tractor-Ferguson system." These draft links not only are used for draft when the tractor is coupled up with an implement, machine or special vehicle, but they are also used for lifting in the way described and claimed in the prior Ferguson patents.

In place of the usual upper Ferguson compression link, a special fixture is attached. This fixture is attached to the rear of the bell crank lever 7 at the point where the conventional Ferguson compression link is pivoted. The fixture carries near the top a ball 13 forming a ball and socket joint with a special upper link 14 which will be more fully described hereinafter. The fixture 15 comprises an upright portion in channel form to give strength and the forward portion of the fixture is curved to drop over the differential housing and fit itself thereto. There is an opening in the channel portion to fit over the screw cap cover of the power take-off opening into the differential housing. The lower end of the channelled upright terminates in a clevis 16. In this clevis swivels the draw bar 17. The draw bar terminates in pins 18 to which are attached the flattened front end portions of the draft links 19. This affords a universal joint at the front end of the draft links. These draft links are arranged in a triangulation with the apex of the triangle at the rear end. The rear end of the draft link frame is pivoted on a horizontal pin 20 to a clevis 21 which is pivoted on a vertical pin 22 to another clevis 23 secured fixedly to the front end of the trailer. This also affords a universal joint.

Projecting rearwardly from the channel and part of the fixture 15 is a special strut frame. This frame comprises a pair of horizontal rearwardly diverging bars 24 and a pair of inclined and rearwardly diverging bars 25. Both of these sets of bars are preferably tubes and are welded to the channelled upright, the horizontal set at the top end and the inclined set at the bottom. They diverge at the rear to support the spacer tube 26, the span of which is approximately the normal distance between the lower draft links in the Ferguson system. The ends of this spacer tube are provided with studs 27 on which the ends of the draft links may be located and held in place by linchpins 28.

This structure when it is hooked up with the usual conventional draft links 12 serves to transfer the draft stress from the draft links 19 to the said draft links 12. The draft links 19 take the place in this improved hitch of the normal draft links. This permits the vertical swiveling axis of the tractor and the trailer to be located at a point quite closely behind a vertical line passing through the midpoint of the rear axle. This is important for so placed the lever arm of force producing side draft, when turning the unbalanced trailer, is negligible and does not seriously interfere with steering. Of course, the ideal place to have this vertical swiveling line is passing directly through the center of the rear axle at its midpoint.

The strut frame could be permanently attached by bolting or welding to the tractor rear axle, but that would interfere with the adaptability of the tractor to handle other implements for which it is designed to be used. Accordingly this strut frame is simply hung on the tractor rear axle housing by being pivoted to the usual bell crank lever 7 used in the "Ford tractor-Ferguson system." It therefore may easily be removed when it is desired to use the tractor for other purposes. The usual draft links 12 are fastened to the studs 27 on the spacer tube 26. This stores these draft links out of the way and at the same time the draft links tie the strut frame to the tractor rear axle housing. The draft goes through the bars 19 through the strut frame and through the draft links 12 to the rear axle housing.

The trailer is provided with a stout inclined tongue or mast 29. This is in the form of a longitudinally tapered tube of rectangular cross-section, preferably provided with reinforcing braces 30. This tongue is given this strong construction because it will be subjected to considerable twisting or torsional strains which it must resist in its function as part of this assembly as stated above. The invention is obviously not limited to constructions in which the tongue 29 projects forwardly an appreciable amount from the trailer frame structure, only the preferred embodiment being illustrated. The important thing is that such tongue be rigid with the implement or trailer. The invention would, therefore, include embodiments in which the tongue projected outwardly at a greater angle to the horizontal, such tongue structure being integral with the trailer to an even greater degree than in the preferred embodiment. At the top it anchors a cross pin 31 which passes through the forward end of the tongue and projects laterally at each side. This pin permits only vertical hinging movement of the upper link 14. This upper link terminates at the top in a strong yoke-like frame 32 which straddles the upper end of the tongue or mast and through which the pin 31 passes. This upper link is made up of two sections. This yoke-like frame has welded thereto a piece of tubing 33. This completes the upper link rear section. This tubing 33 telescopes over another piece of tubing 34 of smaller diameter and on the lower end of this tube 34 is fastened a sleeve or socket member 35 which forms the female member of a ball and socket joint. A plug 36 with a part-spherical socket serves to contact with ball 13. However, the ball and socket are freely separable so in case the lower linkage breaks and the front of the overbalanced trailer drops, the upper link can separate from the tractor. Otherwise it would become a tension link, if the front of the trailer met an obstruction, and as the tractor moved forward this tension link would pull the tractor over backwards.

Inside of the tube 33 is a threaded arbor 37 which engages with the internal threads of the forward tubular section of the upper link. By turning the handle bars 38 of the forward section of the link it will be obvious that the total length of the link may be increased or decreased for controlling the height of the front end of the trailer with respect to the tractor. However, it is not intended that the trailer and tractor will be operated in hauling when the top link is extended. The function of this extension is to provide a means for lifting the trailer front end in respect to the tractor so it can be blocked at this unusual height by the stands 39, Fig. 2, which are lowered into contact with the ground and pinned in place. Then by shortening the top link again the weight of the trailer is taken upon the stands. The top link is free of all compressive loads and all tension in the lower links, due to transferred weight from trailer to tractor, will be lost. Thus when the links are free they may be readily detached.

Referring to Figs. 18 and 19, the mast or tongue of box-like cross-section is connected with the upper compression link 41 by means of a hinging joint 42 which permits relative movement only in a vertical plane. The lower end of this link has a ball and socket joint 43. The ball is fastened to a hinged channel member 44. This member is hinged at 45 to the conventional Ferguson bell crank lever 7. This channel member 44 seats in straddled position over the control rod and spring 6 of the Ferguson hydraulic control mechanism. It will be noted that the ball and socket joint 43 is on the exact vertical line 46 passing through the midway of the rear axle of the tractor.

The lower draft links 47 converge together at their rear ends as shown in Fig. 20 and are pivoted on horizontal pin 48 to a clevis 49 which in turn is pivoted on a vertical pin 50 to a clevis 51 which is a fixed part of the trailer. This affords a universal joint. The front end of the tension links 47, see Fig. 21, are pivoted to the studs 52, one on each end of the draw bar 53 which in turn pivots on a vertical pin 54, which is anchored in the plate 57. Draw bar 53 is made up of two bars (Fig. 22) which straddle the plate 57. Studs 52 are on the ends of stud plates 52a which are welded into the ends of the two bars of the draw bar and act as spacers for these two bars. A cradle 55 is bolted to the bottom of the rear axle housing by bolts 56. This cradle comprises the plate 57 and a pair of V-like spacer castings 58 which act as stops for limiting angular movement of the draw bar 53. Hence the angular movement of the trailer is limited.

A cross rod 59 is attached to the channel plate 44 and welded thereto by metal straps 60. This cross rod is adapted to engage in the path of the lifting arms 61 of the usual Ferguson hydraulic lifting mechanism so as to hold this mechanism in inactive uplifted position when the tractor is being used with the coupling for the trailer.

The numeral 62 is a jack stand or arbor which is screw threaded into the jack tube 64 so that when the arbor 62 is turned the jack may be lowered to bring the foot 63 of the stand down against the ground. This jack stand may be lowered by a ratchet (not shown) which can be located at the point 64. This ratchet can be provided with a handle so that the arbor may be rotated notwithstanding the foot 63 has reached the ground. The foot may have a swivel connection with the jack arbor. This will then serve to jack the front end of the trailer upwardly so that the link 64 may be disengaged from the ball 43 for disconnecting the trailer from the tractor.

From the foregoing it will be evident that the vertical axis on which the trailer pivots or swivels relative to the tractor is located very closely to the vertical line through the midpoint of the tractor rear axle which line represents the center of effort of the tractor rear wheels. In the modified form of structure, shown in Figs. 18 and 19, the trailer swiveling line is almost exactly coincident with the vertical line through the midpoint of the rear axle. In the other form of structure, as shown in Figs. 1 and 2, the trailer swiveling line is just a bit to the rear of the vertical line through the rear axle midpoint which arrangement has a certain advantage in that while its effect on steering is slight it will tend to hold the tractor and trailer in a straight line relationship. In either form of structure the trailer will not disadvantageously affect steering.

In both forms of structure it will be noted that the relationship of the hitch elements is such that the imaginary point of application of the trailer load to the tractor (as defined by the intersection of the imaginary projections of the upper compression and lower tension members) is a point which swings with the trailer. Moreover, the arc through which this point swings is substantially within the base formed by the tractor rear wheels. The location of said point and the arc through which it swings are predetermined by the relationship of the upper and lower members that connect the tractor and trailer. Thus, in any given arrangement of the forward end of the trailer extension or mast above the point of universal connection of the upper compression member with the tractor, the angularity of the compression link will be determined by the length of the lower tension member.

What I claim:

1. In the combination of a semi-trailer adapted to be drawn by a multi-purpose light-weight tractor, a rigid trailer frame having rotary supporting means on opposite sides of the frame near the rear end thereof, an upwardly and forwardly extending member rigid with the front end of said frame and having a construction longitudinally, transversely and torsionally strong to withstand the strains imposed between the ends thereof by any twisting, tipping movement of the fully loaded trailer in any operative position thereof relative to the tractor, a rigid link member pivoted at one end to the outer front end of said upwardly and forwardly extending member for movement relative thereto only on a vertical plane, a universal connection between the other end of said link member and said tractor so located that the universal joint has a center of movement substantially coinciding with or disposed rearwardly of a vertical, central line through the center of effort of the tractor rear wheels, tension means pivotally connecting the tractor and trailer and providing an effective line of draft force which extends forwardly below the rear axle of the tractor, the tension means and the link member being so constructed and arranged as to produce an angularity of the link member which is downwardly and forwardly toward the tractor to intersect the line of draft force below the rear axle and at such a point in advance thereof that the arc described by such point in the relative turning of the tractor and trailer is substantially confined between the tractor rear wheels.

2. In a hitch for an unbalanced semi-trailer the combination of a sturdy forward extension of the trailer frame located substantially on the longitudinal center line of the trailer, a connecting compression link secured to the forward end of said extension for relative movement only about a horizontal transverse axis, means for universally connecting the forward end of said link to an upwardly and rearwardly facing portion of the tractor and in such relation thereto that the universal connecting means is substantially on the vertical line through the center of effort of the tractor rear wheels, the forward end of the extension being higher than the point of connection of the compression link to the tractor, and tension means for connecting the trailer and tractor to establish an effective line of draft force therebetween which will extend below the tractor rear axle.

3. In a hitch for an unbalanced semi-trailer the combination of a forwardly extending tongue on the trailer, a connecting compression link secured to the forward end of said extension for relative movement only about a horizontal transverse axis, means for universally connecting the forward end of said link to the tractor in such relation thereto that the universal connecting means is substantially on the vertical line through the center of effort of the tractor rear wheels, and tension means for connecting the trailer to the tractor dimensioned to maintain said compression link at a downwardly and forwardly extending angle such that in assembly a forward projection of the line of the compression link and the extended force line of the tension means will intersect below and a short distance in front of the tractor rear axle.

4. In a hitch for an unbalanced semi-trailer the combination of a forwardly extending tongue on the trailer, a connecting compression link secured to the forward end of said extension for relative movement only about a horizontal transverse axis, means for universally connecting the forward end of said link to the tractor in such relation thereto that the universal connecting means is substantially on the vertical line through the center of effort of the tractor rear wheels, and tension means for connecting the trailer to the tractor dimensioned to maintain said compression link at a downwardly and forwardly extending angle such that in assembly a forward projection of the line of the compression link and the extended force line of the tension means will intersect below and a short distance in front of the tractor rear axle, the relationship being such that the intersection point of the forces transmitted through the linkage remains in all relative positions of the tractor and trailer substantially within the base of support provided by the tractor wheels.

5. In the combination of an overbalanced two-wheel trailer and a tractor designed for multiple purpose usage with trailing implements or machines, an overbalanced two-wheel trailer provided with an upstanding mast or tongue, a tractor provided with a rear axle and housing arranged for the necessary connections with such implements or machines, an upper compression link having a hinged connection at its rear with the forward end of said tongue, said hinge connection permitting movement only in a vertical plane and the forward end of the compression link having a universal connection on the tractor rear axle housing, and tension linkage having a universal connection with the forward end of the trailer and the underside of the rear axle housing, the said rear axle housing connections with the upper and lower links being vertically aligned on a line that coincides with or is a short distance behind the vertical line through the midportion of the rear axle.

6. In the combination of an overbalanced two-wheel trailer and a tractor designed for multiple purpose usage with trailing implements or machines, an overbalanced two-wheel trailer provided with an upstanding mast or tongue, a tractor provided with a rear axle and housing arranged for the necessary connections with such implements or machines, an upper compression link having a hinged connection at its rear with the forward end of said tongue, said hinge connection permitting movement only in a vertical plane and the forward end of the compression link having a universal connection on the tractor rear axle housing, and tension linkage having a universal connection with the forward end of the trailer and the underside of the rear axle housing, the said rear axle housing connections with the upper and lower links being vertically aligned on a line that coincides with or is a short distance behind the vertical line through the midportion of the rear axle, the height of the said tongue and the length of said upper link being such that, and the lower tension links being located such a distance below the rear axle that the intersecting point of the compression forces and the tension forces is only a short distance forward of the rear axle, said line of the compression forces passing above the rear axle.

7. In the combination of an overbalanced two-wheel trailer and a tractor designed for multiple purpose usage with trailing implements or machines, an overbalanced two-wheel trailer provided with an upstanding mast or tongue, a tractor provided with a rear axle and housing arranged for the necessary connections with such implements or machines, an upper compression link having a hinged connection at its rear with the forward end of said tongue, said hinge connection permitting movement only in a vertical plane and the forward end of the compression link having a universal connection on the tractor rear axle housing, and tension linkage having a universal connection with the forward end of the trailer and the underside of the rear axle housing, the said rear axle housing connections with the upper and lower links being vertically aligned on a line that coincides with or is a short distance behind the vertical line through the mid-portion of the rear axle, a universal joint between the upper link and the rear axle housing being in the form of a separable ball and socket joint in which the parts are free to separate at all times when the compressive forces are changed to tension stresses.

8. In the combination of an overbalanced two-wheel trailer and a tractor designed for multiple purpose usage with trailing implements or machines, an overbalanced two-wheel trailer provided with an upstanding mast or tongue, a tractor provided with a rear axle and housing arranged for the necessary connections with such implements or machines, an upper compression link having a hinged connection at its rear with the forward end of said tongue, said hinge connection permitting movement only in a vertical plane and the forward end of the compression link having a universal connection on the tractor rear axle housing, and tension linkage having a universal connection with the forward end of the trailer and the underside of the rear axle housing, the said rear axle housing connections with the upper and lower links being vertically aligned on a line that coincides with or is a short distance behind the vertical line through the midportion of the rear axle, the said tension linkage comprising a pair of links triangularly arranged with the apex at the trailer end and the base provided with a draw bar connection with the axle housing.

9. In the combination of an overbalanced two-wheel trailer and a tractor designed for multiple purpose usage with trailing implements or machines, an overbalanced two-wheel trailer provided with an upstanding mast or tongue, a tractor provided with a rear axle and housing arranged for the necessary connections with such implements or machines, an upper compression link having a hinged connection at its rear with the forward end of said tongue, said hinge connection permitting movement only in a vertical plane and the forward end of the compression link having a universal connection on the tractor rear axle housing, and tension linkage having a universal connection with the forward end of the trailer and the underside of the rear axle housing, the said rear axle housing connections with the upper and lower links being vertically aligned on a line that coincides with or is a short distance behind the vertical line through the midportion of the rear axle, the connections with the axle housing including a fixture secured to one of said necessary connections for implement attachment, said fixture supporting the universal top and bottom linkage connections and fitting over the rear of the axle housing and detachably tied to the axle housing below the axle.

10. In the combination of an overbalanced two-wheel trailer and a tractor designed for multiple purpose usage with trailing implements or machines, an overbalanced two-wheel trailer provided with an upstanding mast or tongue, a tractor provided with a rear axle and housing arranged for the necessary connections with such implements or machines, an upper compression link having a hinged connection at its rear with the forward end of said tongue, said hinge connection permitting movement only in a vertical plane and the forward end of the compression link having a universal connection on the tractor rear axle housing, and tension linkage having a universal connection with the forward end of the trailer and the underside of the rear axle housing, the said rear axle housing connections with the upper and lower links being vertically aligned on a line that coincides with or is a short distance behind the vertical line through the midportion of the rear axle, the connections with the axle housing including a fixture secured to one of said necessary connections for implement attachment, said fixture supporting the universal top and bottom linkage connections and fitting over the rear of the axle housing and detachably tied to the axle housing below the axle, the fixture including a rearwardly extending strut frame to the rear end of which a set of lower tension links designed for implement connected tension links may be secured, which said links tie the strut frame to the axle housing below the axle and transmit the tension forces thereto.

11. In the combination of an overbalanced two-wheel trailer and a tractor designed for multiple purpose usage with trailing implements or machines, an overbalanced two-wheel trailer provided with an upstanding mast or tongue, a tractor provided with a rear axle and housing arranged for the necessary connections with such implements or machines, an upper compression link having a hinged connection at its rear with the forward end of said tongue, said hinge connection permitting movement only in a vertical plane and the forward end of the compression link having a universal connection on the tractor rear axle housing, and tension linkage having a universal connection with the forward end of the trailer and the underside of the rear axle housing, the said rear axle housing connections with the upper and lower links being vertically aligned on a line that coincides with or is a short distance behind the vertical line through the midportion of the rear axle, the connections with the axle housing including a fixture secured to one of said necessary connections for implement attachment, said fixture supporting the universal top and bottom linkage connections and fitting over the rear of the axle housing and detachably tied to the axle housing below the axle, the fixture supporting a ball at the top for universal connection with the compression link and a clevis at the bottom for a universal draw bar connection with said lower linkage.

12. In the combination of an overbalanced two-wheel trailer and a tractor designed for multiple purpose usage with trailing implements or machines, an overbalanced two-wheel trailer provided with an upstanding mast or tongue, a tractor provided with a rear axle and housing arranged for the necessary connections with such implements or machines, an upper compression link having a hinged connection at its rear with the forward end of said tongue, said hinge connection permitting movement only in a vertical plane and the forward end of the compression link having a universal connection on the tractor rear axle housing, and tension linkage having a universal connection with the forward end of the trailer and the underside of the rear axle housing, the said rear axle housing connections with the upper and lower links being vertically aligned on a line that coincides with or is a short distance behind the vertical line through the midportion of the rear axle, the said rear axle housing connection with the upper link including, a plate-like member which has a detachable connection with one of the necessary connections for implements and which can fold over an implement control member on the rear axle housing.

13. In the combination of an overbalanced two-wheel trailer and a tractor designed for multiple purpose usage with trailing implements or machines, an overbalanced two-wheel trailer provided with an upstanding mast or tongue, a tractor provided with a rear axle and housing arranged for the necessary connections with such implements or machines, an upper compression link having a hinged connection at its rear with the forward end of said tongue, said hinge connection permitting movement only in a vertical plane and the forward end of the compression link having a universal connection on the tractor rear axle housing, and tension linkage having a universal connection with the forward end of the trailer and the underside of the rear axle housing, the said rear axle housing connections with the upper and lower links being vertically aligned on a line that coincides with or is a short distance behind the vertical line through the midportion of the rear axle, the said universal connection of the axle housing with the said tension linkage comprising a cradle pivoting a draw bar, the cradle secured to the under side of the rear axle housing.

14. In the combination of an overbalanced two-wheel trailer and a tractor designed for multiple purpose usage with trailing implements or machines, an overbalanced two-wheel trailer provided with an upstanding mast or tongue, a tractor provided with a rear axle and housing arranged for the necessary connections with such implements or machines, an upper compression link having a hinged connection at its rear with the forward end of said tongue, said hinge connection permitting movement only in a vertical plane and the forward end of the compression link having a universal connection on the tractor rear axle housing, and tension linkage having a universal connection with the forward end of the trailer and the underside of the rear axle housing, the said rear axle housing connections with the upper and lower links being vertically aligned on a line that coincides with or is a short distance behind the vertical line through the midportion of the rear axle, the said universal connection of the axle housing and the said tension linkage comprising a cradle secured to the underside of the axle housing and having V-like spacers at front and back and a draw bar swinging on a vertical pin whose angular movement is limited by said V spacers.

15. In a hitch mechanism of the weight transferring type for swivelingly connecting a forwardly overbalanced trailer to a tractor, the combination comprising means including a compression element extending forwardly from the trailer and hinged thereto for vertical swinging movement, said element being adapted to pivot on the tractor about a vertical axis which passes in the region of the tractor rear axle, means including a tension draft element extending forwardly from the trailer to pivot at a point lying substantially in vertical alinement with said first-mentioned pivot point, said compression element being angled downwardly toward said tractor to such a degree with respect to the tension draft element that the intersection of said elements extended and which locates the line of action of the transferred load is maintained substantially within the base of support provided by the tractor's rear wheels as the trailer swings thru its range of lateral movement.

16. In a hitch mechanism of the weight transferring type for swivelingly connecting a forwardly overbalanced trailer to a tractor, the combination comprising a compression member extending forwardly from the trailer and hinged thereto for vertical swinging movement, said member being adapted to pivot generally universally about a point on the tractor whose locus is on the center of effort of the tractor or slightly behing the same, a tension member extending forwardly from the trailer to pivot at a point lying below the rear axle of the tractor and substantially in vertical alinement with said first mentioned pivot point, said compression member being angled downwardly toward said tractor to such a degree with respect to the tension member that the intersection of said members extended and which locates the line of action of the transferred load is maintained substantially within the base of support provided by the tractor's rear wheels as the trailer swings through its range of lateral movement.

DANIEL C. HEITSHU.

REFERENCES CITED

The following references are of record in the file of this patent:

UNITED STATES PATENTS

| Number | Name | Date |
|---|---|---|
| 2,347,898 | Ferguson | May 2, 1944 |